US006666217B2

(12) United States Patent
Elsner et al.

(10) Patent No.: US 6,666,217 B2
(45) Date of Patent: Dec. 23, 2003

(54) GEMINI SURFACTANTS IN CLEANING COMPOSITIONS

(75) Inventors: Michael Elsner, Heiligenhaus (DE); Manfred Weuthen, Langenfeld (DE); Hans-Christian Raths, Monheim (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 13 days.

(21) Appl. No.: 10/139,126

(22) Filed: May 3, 2002

(65) Prior Publication Data

US 2003/0036496 A1 Feb. 20, 2003

(30) Foreign Application Priority Data

May 4, 2001 (DE) .......................... 101 21 722

(51) Int. Cl.[7] .............. B08B 3/04; C11D 1/72; C11D 3/22; C11D 3/37
(52) U.S. Cl. ............... 134/25.2; 134/25.3; 134/39; 134/40; 134/42; 510/220; 510/356; 510/360; 510/413; 510/421; 510/470; 510/475; 510/505; 510/506; 510/521; 510/524; 510/535; 568/613; 568/622; 523/400; 523/406
(58) Field of Search ................... 510/220, 356, 510/360, 413, 421, 470, 475, 505, 506, 521, 524, 535; 134/25.2, 25.3, 39, 40, 42; 568/613, 622; 523/400, 406

(56) References Cited

U.S. PATENT DOCUMENTS

| | | | |
|---|---|---|---|
| 5,312,932 A | 5/1994 | Behler et al. ............. 554/90 |
| 5,322,957 A | 6/1994 | Fabry et al. ............. 558/23 |
| 5,484,531 A | 1/1996 | Kuehne et al. ............. 210/653 |
| 5,759,987 A * | 6/1998 | Haerer et al. ............. 510/514 |
| 2003/0008801 A1 * | 1/2003 | Raths et al. ............. 510/421 |
| 2003/0036496 A1 * | 2/2003 | Elsner et al. ............. 510/421 |
| 2003/0078176 A1 * | 4/2003 | Elsner et al. ............. 510/220 |
| 2003/0078182 A1 * | 4/2003 | Kischkel et al. ............. 510/421 |
| 2003/0114348 A1 * | 6/2003 | Kischkel et al. ............. 510/446 |
| 2003/0119703 A1 * | 6/2003 | Elsner et al. ............. 510/421 |

FOREIGN PATENT DOCUMENTS

| | | | |
|---|---|---|---|
| DE | 0 561 825 | 11/1991 | ......... C07C/305/10 |
| DE | 0 561 999 | 11/1991 | ......... C07C/305/10 |
| DE | 42 04 700 | 2/1992 | ......... B01D/61/14 |
| DE | 43 23 252 | 7/1993 | ......... C11D/1/825 |
| DE | 4321022 * | 1/1995 | ......... C07C/303/24 |
| DE | 10121722 * | 11/2002 | ......... C11D/1/825 |
| DE | 10121724 * | 11/2002 | ......... C11D/1/825 |
| DE | 10137925 * | 2/2003 | ......... C08L/29/02 |
| DE | 10152142 * | 4/2003 | ......... C11D/17/00 |

OTHER PUBLICATIONS

Derwent Patent Abstract of DE 4321022 (Wangemann et al), Jan. 5, 1995, Acc No. 1995-037121.*
A.Biswas et al.,"Surface-Active Properties of Sodium Salts of Sulfated Fatty Acid Monoglycerides" The Journal of The American Oil Chemists Society vol. 37, 4/60 pp. 171–175.
Fahim U. Ahmed Efficient Synthesis of Fatty Monoglyceride Sulfates from Fatty Acids and Fatty Acid Methyl Esters. JAOCS, vol. 67, No. 1 (Jan. 1990) pp. 8–14.

* cited by examiner

Primary Examiner—Brian P. Mruk
(74) Attorney, Agent, or Firm—John E. Drach; Steven J. Trzaska

(57) ABSTRACT

A cleaning composition containing a gemini surfactant corresponding to formula I:

$$R-CHOH-CH_2-[OCH_2CH_2]_x-O-CH_2-CHOH-R \quad (I)$$

wherein R is a linear or branched alkyl and/or alkenyl radical having from about 4 to 22 carbon atoms, and x is a number from about 5 to 90.

20 Claims, No Drawings

GEMINI SURFACTANTS IN CLEANING COMPOSITIONS

BACKGROUND OF THE INVENTION

The invention relates to gemini surfactants, optionally in combination with ingredients customary in rinse aids, optionally with further nonionic surfactants and anionic surfactants, and to the use of the gemini surfactants for improving the wetting behavior in rinse aids.

Compositions for the washing and cleaning of hard non-textile surfaces which are intended for the household and industrial sector, which mostly develop, upon use, a small volume of foam which further decreases significantly within a few minutes. Compositions of this type have been known for a long time and are established in the market. These are essentially aqueous surfactant solutions of varying type with or without the addition of builders, solubility promoters (hydrotropic agents) or solvents. However, to demonstrate the effectiveness, a certain foaming of the application solution at the start of the cleaning operation is desired by the consumer, although the foam should rapidly collapse so that surfaces which have been cleaned once do not have to be wiped again. For this purpose, low-foaming nonionic surfactants are usually added to compositions of said type.

Nowadays, higher requirements are placed on dishes washed by machine than on dishes washed manually. For example, an item of tableware which has been completely cleaned of food residues is not assessed as perfect if, after the machine dishwashing, it still has whitish marks based on water hardness or other mineral salts which, for a lack of wetting agents, originate from dried-up water drops.

In order to obtain gleaming and spotless tableware, a rinse aid is therefore used. The addition of a liquid or solid rinse aid, which may be added separately or is already in ready-to-use presentation form with the detergent and/or regenerating salt ("2 in 1", "3 in 1", e.g. in the form of tabs and powders), ensures that the water runs off as completely as possible from the ware, so that the various surfaces are residue-free and gleaming at the end of the wash program.

Commercially available rinse aids are mixtures of, for example, nonionic surfactants, solubility promoters, organic acids and solvents, water and optionally preservatives and fragrances. The aim of the surfactants in these compositions is to influence the interfacial tension of the water so that it can run off from the wear in the thinnest possible coherent film so that, during the subsequent drying operation, no water drops, streaks or films remain (wetting action).

For this reason, surfactants in rinse aids must also suppress the foam which arises as a result of food residues in the dishwashing machine. Since most rinse aids comprise acids to improve the clear drying effect, the surfactants used must additionally be relatively hydrolysis-insensitive toward acids.

Rinse aids are used both domestically and in industrial sectors. In domestic dishwashers the rinse aid is mostly metered in after the prerinse and washing cycle at just under 40° C.–65° C. Industrial dishwashing machines operate with only one wash liquor which is only replaced by the addition of the rinse aid solution from the previous wash cycle. There is thus no complete water change during the entire wash program. For this reason, the rinse aid must also have a foam-suppressing action, be thermally stable at a sharp temperature gradient of 85–35° C. and, in addition, must be sufficiently stable toward alkali and active chlorine.

An object of the present invention was to provide rinse aids which simultaneously exhibit good foaming behavior and cleaning behavior, but in particular very good run-off behavior, i.e. an improvement in the wetting behavior on plastic surfaces.

The object was achieved by using selected gemini surfactants.

DESCRIPTION OF THE INVENTION

The invention provides gemini surfactants of the formula (I)

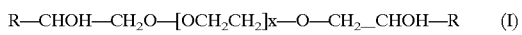

in which R is a linear or branched alkyl and/or alkenyl radical having 4 to 22, preferably 8 to 18, in particular 8 to 12 carbon atoms and x is 5 to 90, preferably 10 to 45 and in particular 12 to 35.

Gemini Surfactants

Generally, gemini surfactants are prepared by reacting 1,2-epoxyalkanes ($CH_2CHO$—R), where R is a linear or branched, saturated or unsaturated alkyl and/or alkenyl radical, with polyols.

Polyol is used here as the collective term for polyhydric alcohols or polyalkylene glycols, i.e. as an organic compound which contains at least two hydroxyl groups in the molecule. Polyalkylene glycols are also to be understood as meaning reaction products of polyhydric alcohols with alkoxylation reagents such as ethylene oxide and propylene oxide.

For the purposes of the invention, polyethylene glycol HO—[$OCH_2CH_2$]x—OH is used as polyol.

Particular preference is given to gemini surfactants of the formula (I) where x is 10 to 45, preferably 12 to 35.

Very particular preference is given to gemini surfactants of the formula (I) where R is a linear or branched alkyl radical having 8 to 12 carbon atoms. Preference is also given to gemini surfactants of the formula (I) where R is a linear alkyl radical having 8 to 12 carbon atoms, in particular having 10 carbon atoms.

In a further embodiment, preference is given to gemini surfactants of the formula (I) which are characterized in that they comprise at least 80% by weight, preferably 85 to 100% by weight, in particular 95 to 100% by weight, of gemini surfactants in which all the free hydroxyl groups of the polyethylene glycol are capped with 1,2-epoxyalkane units.

In addition, in a further embodiment, rinse aids are claimed which comprise the gemini surfactants according to the invention and further ingredients customary in rinse aids. These customary ingredients can, as described below, be alkyl and/or alkenyl oligoglycosides, further nonionic surfactants, anionic surfactants and further auxiliaries and additives. Very particular preference is given here to rinse aids which comprise gemini surfactants of the formula (I) in which x is 5 to 90, preferably 10 to 45, in particular 12 to 35 and R is a linear or branched alkyl and/or alkenyl radical having 4 to 22 carbon atoms.

Alkyl and/or Alkenyl Oligoglycosides

In a further embodiment, the rinse aids according to the invention comprise alkyl and/or alkenyl oligoglycosides of the formula (II).

where $R^1$ is an alkyl and/or alkenyl radical having 4 to 22 carbon atoms, G is a sugar radical having 5 or 6 carbon atoms and p is a number from 1 to 10.

They can be obtained by the appropriate methods of preparative organic chemistry. The alkyl and/or alkenyl oligoglycosides can be derived from aldoses or ketoses having 5 or 6 carbon atoms, preferably glucose. The preferred alkyl and/or alkenyl oligoglycosides are thus alkyl and/or alkenyl oligoglucosides.

The alkyl radical $R^1$ can be derived from primary saturated alcohols. Typical examples are butanol-1, caproic, enanthic, caprylic, pelargonic, capric alcohol, undecanol-1, lauryl alcohol, tridecanol-1, myristyl alcohol, pentadecanol-1, cetyl alcohol, palmityl alcohol, heptadecanol-1, stearyl alcohol, isostearyl alcohol, nonadecanol-1, arachidyl alcohol, heneicosanol-1, and behenyl alcohol, and technical-grade mixtures thereof, as are obtained, for example, in the hydrogenation of technical-grade fatty acid methyl esters or in the course of the hydrogenation of aldehydes from the Roelen oxo synthesis.

The alkenyl radical $R^1$ can be derived from primary unsaturated alcohols. Typical examples of unsaturated alcohols are undecen-1-ol, oleyl alcohol, elaidyl alcohol, ricinol alcohol, linoleyl alcohol, linolenyl alcohol, gadoleyl alcohol, arachidonyl alcohol, eurucyl alcohol, brassidyl alcohol, palmoleyl alcohol, petroselinyl alcohol, arachyl alcohol, and technical-grade mixtures thereof which can be obtained as described above.

Preference is given to alkyl or alkenyl radical $R^1$ derived from primary alcohols having 6 to 16 carbon atoms.

Alkyl oligoglucosides of chain length $C_8$–$C_{10}$ which form as forerunnings in the fractional distillation of technical-grade $C_8$–$C_{18}$-coconut fatty alcohol and may be contaminated with a proportion of less than 6% by weight of $C_{12}$-alcohol, and also alkyl oligoglucosides based on technical-grade $C_{9/11}$-oxo alcohols are particularly suitable.

The alkyl or alkenyl radical $R^1$ can also be derived from primary alcohols having 12 to 14 carbon atoms.

The index p in the general formula (II) gives the degree of oligomerization (DP), i.e. the distribution of mono- and oligoglycosides and is a number between 1 and 10. While p in a given compound must always be a whole number and here, in particular, can assume the values p=1 to 3, the value p for a certain alkyl oligoglycoside is an analytically determined calculated parameter which in most cases is a fraction.

Preference is given to using alkyl and/or alkenyl oligoglycosides with an average degree of oligomerization p of from 1.1 to 2.0. From an applications view point, preference is given to both alkyl and/or alkenyl oligoglycosides whose degree of oligomerization is less than 2.0 and in particular is between 1.2 and 1.7.

Preference is given to using alkyl and/or alkenyl oligoglycosides of the formula (II), where p is a number from 1 to 3 and $R^1$ is an alkyl radical having 6 to 16 carbon atoms.

In a preferred embodiment, the rinse aids according to the invention comprise 0.01 to 25% by weight, preferably 0.025 to 20% by weight and in particular 0.1 to 15% by weight of gemini surfactants of the formula (I), calculated as active substance, based on the compositions.

Active substance is defined here as the mass of surfactant (calculated as 100%-pure substance) which are present in the composition.

In a further embodiment, the rinse aids according to the invention comprise 0.01 to 30% by weight, preferably 0.1 to 20% by weight and in particular 0.2 to 15% by weight of alkyl and/or alkenyl oligoglycosides of the formula (II), calculated as active substance, based on the compositions.

Nonionic Surfactants

The rinse aids according to the invention can comprise further nonionic surfactants. Typical examples of nonionic surfactants are alkoxylates of alkanols, terminally capped alkoxylates of alkanols without free OH groups, alkoxylated fatty acid lower alkyl esters, amine oxides, alkylphenol polyglycol ethers, fatty acid polyglycol esters, fatty acid amide polyglycol ethers, fatty amine polyglycol ethers, alkoxylated triglycerides, mixed ethers or mixed formals, fatty acid N-alkylglucamides, protein hydrolysates (in particular plant products based on wheat), polyol fatty acid esters, sugar esters, sorbitan esters and polysorbates. If the nonionic surfactants contain polyglycol ether chains, these may have a conventional homolog distribution, but preferably have a narrowed homolog distribution.

Preference is given to the other nonionic surfactants chosen from the group formed by alkoxylates of alkanols, in particular fatty alcohol polyethylene glycol/polypropylene glycol ethers (FAEO/PO) of the formula (III) and fatty alcohol polypropylene glycol/polyethylene glycol ethers (FAPO/EO) of the formula (IV), terminally capped alkoxylates of alkanols, in particular terminally capped fatty alcohol polyethylene glycol/polypropylene glycol ethers or terminally capped fatty alcohol polypropylene glycol/polyethylene glycol ethers, and fatty acid lower alkyl esters and amine oxides.

Fatty Alcohol Polyethylene Glycol/Polypropylene Glycol Ethers

In a preferred embodiment, use is made of fatty alcohol polyethylene glycol/polypropylene glycol ethers of the formula (III), which may be terminally capped,

$$R^6O(CH_2CH_2O)_{n1}[CH_2(CH_3)CHO]_mR^7 \qquad (III)$$

in which $R^6$ is an alkyl and/or alkenyl radical having 8 to 22 carbon atoms, $R^7$ is H or an alkyl radical having 1 to 8 carbon atoms, n1 is a number from 1 to 40, preferably 1 to 30, in particular 1 to 15, and m is 0 or a number from 1 to 10.

Fatty Alcohol Polypropylene Glycol/Polyethylene Glycol Ethers

Also suitable are fatty alcohol polypropylene glycol/polyethylene glycol ethers of the formula (IV) which may be terminally capped,

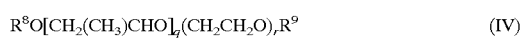

$$R^8O[CH_2(CH_3)CHO]_q(CH_2CH_2O)_rR^9 \qquad (IV)$$

in which $R^8$ is an alkyl and/or alkenyl radical having 8 to 22 carbon atoms, $R^9$ is H or an alkyl radical having 1 to 8 carbon atoms, q is a number from 1 to 5 and r is a number from 0 to 15.

According to a preferred embodiment, the rinse aids according to the invention comprise fatty alcohol polyethylene glycol/polypropylene glycol ethers of the formula (III) in which $R^6$ is an aliphatic, saturated, straight-chain or branched alkyl radical having 8 to 16 carbon atoms, n1 is a number from 1 to 10, and m is 0 and $R^7$ is hydrogen. These are addition products of from 1 to 10 mol of ethylene oxide onto monofunctional alcohols. Suitable alcohols are the alcohols described above, such as fatty alcohols, oxo alcohols and Guerbet alcohols.

Of such alcohol ethyoxylates, those which have a narrowed homolog distribution are also suitable.

Further suitable representatives of non-terminally capped representatives are those of the formula (III) in which $R^6$ is an aliphatic, saturated, straight-chain or branched alkyl radical having 8 to 16 carbon atoms, n1 is a number from 2 to 7, m is a number from 3 to 7 and $R^7$ is hydrogen. These are addition products of monofunctional alcohols of the type already described alkoxylated firstly with 2 to 7 mol of ethylene oxide and then with 3 to 7 mol of propylene oxide.

The terminally capped compounds of the formula (III) are capped with an alkyl group having 1 to 8 carbon atoms ($R^7$).

Such compounds are often also referred to in the literature as mixed ethers. Suitable representatives are methyl group-capped compounds of the formula (III) in which $R^6$ is an aliphatic, saturated, straight-chain or branched alkyl radical having 8 to 16 carbon atoms, n1 is a number from 2 to 7, m is a number from 3 to 7 and $R^7$ is a methyl group. Such compounds can be prepared readily by reacting the corresponding non-terminally capped fatty alcohol polyethylene glycol/polypropylene glycol ethers with methyl chloride in the presence of a base.

Suitable representatives of alkyl-terminally capped compounds are those of the formula (III) in which $R^6$ is an aliphatic, saturated, straight-chain or branched alkyl radical having 8 to 16 carbon atoms, n1 is a number from 5 to 15, m is 0 and $R^7$ is an alkyl group having 4 to 8 carbon atoms. The terminal capping is preferably carried out with a straight-chain or branched butyl group by reacting the corresponding fatty alcohol polyethylene glycol ether with n-butyl chloride or with tert-butyl chloride in the presence of bases.

Instead of the compounds of the formula (III) or in a mixture therewith, it is also possible for terminally capped fatty alcohol polypropylene glycol/polyethylene glycol ethers of the formula (IV) to be present. Such compounds are described, for example, in German Laid-Open Specification DE-A1-43 23 252. Particularly preferred representatives of the compounds of the formula (IV) are those in which $R^8$ is an aliphatic, saturated, straight-chain or branched alkyl radical having 8 to 16 carbon atoms, q is a number from 1 to 5, r is a number from 1 to 6 and $R^9$ is hydrogen. These are preferably addition products of from 1 to 5 mol of propylene oxide and from 1 to 6 mol of ethylene oxide onto monofunctional alcohols which have already been described as suitable in connection with the gemini surfactants.

Alkoxylated Fatty Acid Lower Alkyl Esters

Suitable alkoxylated fatty acid lower alkyl esters are surfactants of the formula (V),

$$R^{10}CO-)OCH_2CHR^{11})_wOR^{12} \quad (V)$$

in which $R^{10}CO$ is a linear or branched, saturated and/or unsaturated acyl radical having 6 to 22 carbon atoms, $R^{11}$ is hydrogen or methyl, $R^{12}$ is linear or branched alkyl radicals having 1 to 4 carbon atoms and w is a number from 1 to 20. Typical examples are the formal insertion products of, on average, from 1 to 20 and preferably 5 to 10, mol of ethylene oxide and/or propylene oxide into the methyl, ethyl, propyl, isopropyl, butyl and tert-butyl esters of caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselic acid, linoleic acid, linolenic acid, elaeostearic acid, arachidic acid, gadoleic acid, behenic acid and erucic acid, and technical-grade mixtures thereof. The products are usually prepared by inserting the alkylene oxides into the carbonyl ester bond in the presence of special catalysts, such as, for example, calcined hydrotalcite. Particular preference is given to reaction products of, on average, 5 to 10 mol of ethylene oxide into the ester bond of technical-grade coconut fatty acid methyl esters.

Amine Oxides

In amine oxides which may be used are compounds of the formula (VI) and/or [lacuna].

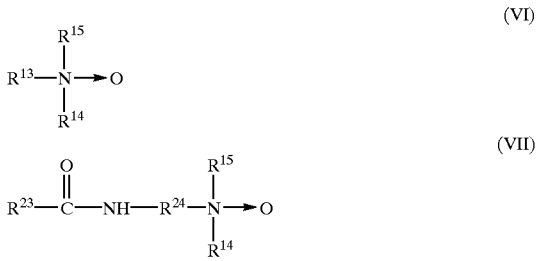

The preparation of the amine oxides of the formula (VI) starts from tertiary fatty amines which have at least one long alkyl radical, which are oxidized in the presence of hydrogen peroxide. In the amine oxides of the formula (VI) which are suitable for the purposes of the invention, $R^{13}$ is a linear or branched alkyl radical having 6 to 22, preferably 12 to 18, carbon atoms, and $R^{14}$ and $R^{15}$, independently of one another, are $R^{13}$ or an optionally hydroxy-substituted alkyl radical having 1 to 4 carbon atoms. Preference is given to using amine oxides of the formula (VI) in which $R^{13}$ and $R^{14}$ are $C_{12/14}$- or $C_{12/18}$-cocoalkyl radicals, and $R^{15}$ is a methyl or a hydroxyethyl radical. Preference is likewise given to amine oxides of the formula (VI) in which $R^{13}$ is a $C_{12/14}$- or $C_{12/18}$-cocoalkyl radical and $R^{14}$ and $R^{15}$ have the meaning of a methyl or hydroxyethyl radical.

Further suitable amine oxides are alkylamido-amine oxides of the formula (VII), where the alkylamido radical $R^{23}CONH$ is formed as a result of the reaction of linear or branched carboxylic acids, preferably having 6 to 22, preferably having 12 to 18, carbon atoms, in particular from $C_{12/14}$- or $C_{12/18}$-fatty acids with amines. Here, $R^{24}$ is a linear or branched alkylene group having 2 to 6, preferably 2 to 4, carbon atoms and $R^{14}$ and $R^{15}$ have the meaning given in formula (VI).

The further nonionic surfactants can be present in the rinse aids according to the invention in amounts of from 0.1 to 15% by weight, preferably 0.5 to 10% by weight, in particular 1 to 8% by weight, calculated as active substance, based on the compositions.

According to the present invention, the rinse aids according to the invention may comprise anionic surfactants.

Anionic Surfactants

Typical examples of anionic surfactants are soaps, alkylbenzenesulfonates, secondary alkanesulfonates, olefinsulfonates, alkyl ether sulfonates, glycerol ether sulfonates, α-methyl ester sulfonates, sulfo fatty acids, alkyl and/or alkenyl sulfates, alkyl ether sulfates, glycerol ether sulfates, hydroxy mixed ether sulfates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid eisethionates, fatty acid sarcosinates, fatty acid taurides, N-acylamino acids, such as, for example, acyl lactylates, acyl tartrates, acyl glutamates and acyl aspartates, alkyl oligoglucoside sulfates, protein fatty acid condensates (in particular plant products based on wheat) and alkyl (ether) phosphates. If the anionic surfactants contain polyglycol ether chains, these may have a conventional homolog distribution, but preferably have a narrowed homolog distribution.

The anionic surfactants are preferably chosen from the group formed by alkyl and/or alkenyl sulfates, alkyl ether sulfates, alkylbenzenesulfonates, monoglyceride (ether) sulfates and alkanesulfonates, in particular fatty alcohol sulfates, fatty alcohol ether sulfates, secondary alkanesulfonates and linear alkylbenzenesulfonates.

Alkyl and/or Alkenyl Sulfates

Alkyl and/or alkenyl sulfates, which are also frequently referred to as fatty alcohol sulfates, are to be understood as meaning the sulfation products of primary alcohols which conform to the formula (VIII)

$$R^{16}O-SO_3X \quad (VIII)$$

in which $R^{16}$ is a linear or branched, aliphatic alkyl and/or alkenyl radical having 6 to 22, preferably 12 to 18, carbon atoms, and X is an alkali metal and/or alkaline earth metal, ammonium, alkylammonium, alkanolammonium or glucammonium.

Typical examples of alkyl sulfates which can be used for the purposes of the invention are the sulfation products of caproic alcohol, caprylic alcohol, capric alcohol, 2-ethylhexyl alcohol, lauryl alcohol, myristyl alcohol, cetyl alcohol, palmoleyl alcohol, stearyl alcohol, isostearyl alcohol, oleyl alcohol, elaidyl alcohol, petroselinyl alcohol, arachidyl alcohol, gadoleyl alcohol, behenyl alcohol and erucyl alcohol, and technical-grade mixtures thereof which are obtained by high-pressure hydrogenation of technical-grade methyl ester fractions or aldehydes from the Roelen oxo synthesis. The sulfation products can preferably be used in the form of their alkali metal salts and in particular their sodium salts. Particular preference is given to alkyl sulfates based on $C_{16/18}$-tallow fatty alcohols or vegetable fatty alcohols of comparable carbon chain distribution in the form of their sodium salts.

Alkyl Ether Sulfates

Alkyl ether sulfates ("ether sulfates") are known anionic surfactants which are prepared industrially by $SO_3$ or chlorosulfonic acid (CSA) sulfation of fatty alcohol or oxo alcohol polyglycol ethers and subsequent neutralization.

For the purposes of the invention, suitable ether sulfates conform to the formula (IX)

$$R^{17}O-(CH_2CH_2O)_aSO_3X \quad (IX)$$

in which $R^{17}$ is a linear or branched alkyl and/or alkenyl radical having 6 to 22 carbon atoms, a is a number from 1 to 10 and X is an alkali metal and/or alkaline earth metal, ammonium, alkylammonium, alkanolammonium or glucammonium. Typical examples of the sulfates of addition products of, on average, 1 to 10 and in particular 2 to 5, mol of ethylene oxide onto caproic alcohol, caprylic alcohol, 2-ethylhexyl alcohol, capric alcohol, lauryl alcohol, isotridecyl alcohol, myristyl alcohol, cetyl alcohol, palmoleyl alcohol, stearyl alcohol, isostearyl alcohol, oleyl alcohol, elaidyl alcohol, petroselinyl alcohol, arachidyl alcohol, gadoleyl alcohol, behenyl alcohol, erucyl alcohol and brassidyl alcohol, and the technical-grade mixtures thereof in the form of their sodium and/or magnesium salts. The ether sulfates may here have either a conventional homolog distribution or a narrowed homolog distribution. Particular preference is given to the use of ether sulfates based on adducts of, on average, 2 to 3 mol of ethylene oxide onto technical-grade $C_{12/14}$- or $C_{12/18}$-coconut fatty alcohol fractions in the form of their sodium and/or magnesium salts.

Alkylbenzenesulfonates

Alkylbenzenesulfonates preferably conform to the formula (X), $$R^{18}-Ph-SO_3X \quad (X)$$

in which $R^{18}$ is a branched, but preferably linear, alkyl radical having 10 to 18 carbon atoms, Ph is a phenyl radical and X is an alkali metal and/or alkaline earth metal, ammonium, alkylammonium, alkanolammonium or glucammonium. Preference is given to using dodecylbenzenesulfonates, tetradecylbenzenesulfonates, hexadecylbenzenesulfonates and technical-grade mixtures thereof in the form of the sodium salts.

Monoglyceride (Ether) Sulfates

Monoglyceride sulfates and monoglyceride ether sulfates are known anionic surfactants which can be obtained in accordance with the appropriate methods of preparative organic chemistry. They are usually prepared from triglycerides which, optionally after ethoxylation, are esterified to give the monoglycerides and are subsequently sulfated and neutralized. It is likewise possible to react the partial glycerides with suitable sulfation agents, preferably gaseous sulfur trioxide or chlorosulfonic acid [cf. EP 0561825 B1, EP 0561999 B1 (Henkel)]. The neutralized substances can, if desired, be subjected to ultrafiltration in order to reduce the electrolyte content to a desired degree [DE 4204700 A1 (Henkel)]. Overviews relating to the chemistry of the monoglyceride sulfates are given, for example, by A. K. Biswas et al. in J.Am.Oil.Chem.Soc. 37, 171 (1960) and F. U. Ahmed J.Am.Oil.Chem.Soc. 67, 8 (1990). The monoglyceride (ether) sulfates be used for the purposes of the invention conform to the formula (XI).

$$\begin{array}{l} CH_2O(CH_2CH_2O)_{\overline{c}}-COR^{19} \\ | \\ CH-O(CH_2CH_2O)_dH \\ | \\ CH_2O(CH_2CH_2O)_{\overline{e}}-SO_3X \end{array} \quad (XI)$$

in which $R^{19}CO$ is a linear or branched acyl radical having 6 to 22 carbon atoms, c, d, and e are in total 0 or numbers from 1 to 30, preferably 2 to 10, and X is an alkali metal or alkaline earth metal. Typical examples of monoglyceride (ether) sulfates suitable for the purposes of the invention are the reaction products of lauric acid monoglyceride, coconut fatty acid monoglyceride, palmitic acid monoglyceride, stearic acid monoglyceride, oleic acid monoglyceride and tallow fatty acid monoglyceride, and ethylene oxide adducts thereof with sulfur trioxide or chlorosulfonic acid in the form of their sodium salts. Preference is given to using monoglyceride sulfates of the formula (XI) in which $R^{19}CO$ is a linear acyl radical having 8 to 18 carbon atoms.

Alkanesulfonates

Alkanesulfonates are to be understood as meaning compounds of the formula (XII).

$$\begin{array}{c} R^{20}-CH-R^{21} \\ | \\ SO_3H \end{array} \quad (XI)$$

$R^{20}$ and $R^{21}$ are alkyl radicals, where $R^{20}$ and $R^{21}$ together should not have more than 50 carbon atoms.

Likewise, the rinse aids can comprise 0.01 to 20% by weight, preferably 0.25 to 15% by weight, in particular 0.4 to 10% by weight, of anionic surfactants, calculated as active substance, based on the compositions. The remainder to 100% by weight can comprise auxiliaries and additives and water.

Auxiliaries and Additives

The rinse aids according to the invention can comprise, as customary ingredients or auxiliaries and additives, for example solubility promoters, such as cumenesulfonate, ethanol, isopropyl alcohol, ethylene glycol, propylene glycol, butyl glycol, diethylene glycol, propylene glycol monobutyl ether, polyethylene or polypropylene glycol ethers having molar masses of from 600 to 1 500 000, preferably with a molar mass of from 400 000 to 800 000, or in particular, butyl diglycol. In addition, organic acids, such as mono- and/or polyhydric carboxylic acids, preferably citric acid, and also preservative and fragrances can be used.

Also preferred is the use of gemini surfactants of the formula (I) in rinse aids, preferably in the household and in the industrial and institutional sector for the rinsing and cleaning of hard surfaces. Hard surfaces are, inter alia, ceramic surfaces, metal surfaces, painted surfaces, plastic surfaces and surfaces made of glass, stone, concrete, porcelain and wood.

The invention further provides the use of the gemini surfactants of the formula (I) according to the invention for improving the wetting behavior in rinse aids, preferably on hard surfaces, in particular in combined products of machine dishwashing detergents and rinse aid.

In contrast to the hydroxy mixed ethers known hitherto, the gemini surfactants according to the invention are characterized, in addition to their foam-suppressing action and the high compatibility, in particular toward plastic, by their higher melting points. As a result, they are particularly suitable for the simplified preparation of solid formulations. As a result of their higher melting points, the gemini surfactants likewise dissolve in the cleaning liquor later and develop their action in a time-delayed manner and in higher concentration. This effect can be utilized particularly advantageously in solid combination products of detergent and rinse aid.

The rinse aids can either be in the form of aqueous solutions or in solid form, e.g. infused into wax or in the form of a gel.

Particular preference is given to aqueous rinse aids which comprise at least 50% by weight, based on the composition, of water.

Also preferred is the use of gemini surfactants of the formula (I) in combination with alkyl and/or alkenyl oligoglycosides in rinse aids.

EXAMPLES

Screening Method for Evaluating the Wetting Properties of Surfactant Solutions Toward Plastic Materials The wetting properties of surfactant solutions toward plastics was determined in a simplified screening in accordance with the conditions/test parameters in a commercially available dishwashing machine, but without using one.

To evaluate the wetting properties, plastic test pieces measuring 20×5 cm are firstly cleaned with 1% strength NaOH and then with isopropanol. The test pieces pretreated in this way are then dipped into the solution to be tested and removed again directly. The evaluation is carried out visually establishing a ranking list or according to a scale of grades from 1–5. In this connection, 5 means that spontaneous cracking of the liquid film arises and wetting is completely reversed. Grade 5 is obtained when water is used. Grade 1 means complete wetting of the plastic surface with uniform run-off of the liquid film.

Test Parameters:

| | |
|---|---|
| Water hardness: | 2° German hardness |
| Salt content: | 700 ppm |
| Temperature: | 60° C. |
| Surfactant concentration: | 0.1% |

Test Pieces:

PP (polypropylene); PE (polyethylene); PC (polycarbonate);

Table 1 shows the experiment results, C1 to C2 being the comparative experiments and I, II and III being the examples according to the invention.

TABLE 1

| | Wetting properties on plastics | | | | |
|---|---|---|---|---|---|
| Composition in % of active substance | C1 | C2 | I | II | III |
| 2-Hydroxydodecyl ether-PEG 600-2-hydroxydodecyl ether[1] | — | — | — | — | 0.1 |
| 2-Hydroxydodecyl ether-PEG 1000-2-hydroxydodecyl ether[2] | — | — | — | 0.1 | — |
| 2-Hydroxydodecyl ether-PEG 1500-2-hydroxydodecyl ether[3] | — | — | 0.1 | — | — |
| Poly Tergent SLF-18B-45* | — | 0.1 | — | | |
| Water, 2° German hardness/700 ppm of NaCl | 100 | 99.9 | 99.9 | 99.9 | 99.9 |
| Wetting properties on plastics | | | | | |
| Temperature: 60° C./"PP" plastic | 5 | 4 | 2 | 1 | 3 |
| Temperature: 60° C./"PE" plastic | 5 | 3 | 2 | 1 | 4 |
| Temperature: 60° C./"PC" plastic | 5 | 4 | 2 | 1 | 3 |

*Alcohol alkoxylate from Olin Chemicals with 1 PO and 22 EO,
[1]Gemini surfactant with, on average, 13 [OCH$_2$CH$_2$] units
[2]Gemini surfactant with, on average, 22 [OCH$_2$CH$_2$] units
[3]Gemini surfactant with, on average, 34 [OCH$_2$CH$_2$] units Clear Rinse Performance The clear rinse performance was assessed visually by test persons. For this, glassware, cutlery, plastic plates and porcelain plates were washed under defined conditions in a domestic dishwashing machine. The ware is then assessed under defined light ratios (assessment of marks and deposits). The results are given as "significantly better/ better/the same/poorer than standard". The standard is defined again for each test series.

Table 2 shows the experimental results, where C1 and C2 are the comparative experiments (=standard) and I to V are the examples according to the invention.

TABLE 2

Clear rinse performance

| Composition in % of active substance | C1 | C2 | I | II | III | IV | V |
|---|---|---|---|---|---|---|---|
| 2-Hydroxydodecyl ether-PEG 600-2-hydroxydodecyl ether[1] | | | 15.0 | | | | |
| 2-Hydroxydodecyl ether-PEG 1000-2-hydroxydodecyl ether[2] | | | | 15.0 | | 3.0 | |
| 2-Hydroxydodecyl ether-PEG 1500-2-hydroxydodecyl ether[3] | | | | | 15.0 | | 3.0 |
| C 12/14 FA + 5 EO + 4 PO[4] | | 12.0 | | | | 12.0 | 12.0 |
| Poly Tergent SLF-18B-45* | 15.0 | 3.0 | | | | | |
| Na cumene sulfonate | 3.5 | 3.0 | 4.0 | 4.0 | 4.0 | 3.0 | 3.0 |
| Citric acid | 5.0 | 5.0 | 5.0 | 5.0 | 5.0 | 5.0 | 5.0 |
| Water | | | | ad 100 | | | |
| Clear rinse performance ++ = significantly better/+ = better than standard/o = as standard/− = poorer than standard | | | | | | | |
| Cutlery | o | o | o | + | o | + | o |
| Porcelain | o | o | o | + | o | + | o |
| Plastic | o | o | + | ++ | + | ++ | + |

*Alcohol alkoxylate from Olin Chemicals with 1 PO and 22 EO
[1]Gemini surfactant with, on average, 13 [OCH$_2$CH$_2$] units
[2]Gemini surfactant with, on average, 22 [OCH$_2$CH$_2$] units
[3]Gemini surfactant with, on average, 34 [OCH$_2$CH$_2$] units
[4]C12/14-fatty alcohol polyglycol ether with 5 EO and 4 PO Table 2 clearly shows that the rinse aids according to the invention are significantly better than the comparative rinse aids (C1 and C2). This is evident particularly for the clear rinse performance on plastic surfaces.

What is claimed is:

1. A cleaning composition containing a gemini surfactant corresponding to formula I:

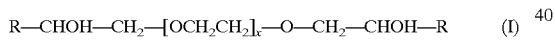
$$R—CHOH—CH_2—[OCH_2CH_2]_x—O—CH_2—CHOH—R \quad (I)$$

wherein R is a linear or branched alkyl and/or alkenyl radical having from about 4 to 22 carbon atoms, and x is a number from about 5 to 90.

2. The composition of claim 1 wherein in formula I x is a number from about 10 to 45.

3. The composition of claim 1 wherein in formula I x is a number from about 12 to 35.

4. The composition of claim 1 wherein in formula I R is a linear alkyl radical having from about 8 to 12 carbon atoms.

5. The composition of claim 1 wherein at least about 80% by weight of the gemini surfactant present in the composition have all free hydroxyl groups of polyethylene glycol capped with 1,2-epoxyalkanes.

6. The composition of claim 1 wherein the gemini surfactant is present in the composition in an amount of from about 0.01 to 25% by weight, based on the weight of the composition.

7. The composition of claim 1 wherein the composition further comprises an auxiliary surfactant selected from the group consisting of a nonionic surfactant, an anionic surfactant, and mixtures thereof.

8. The composition of claim 7 wherein the nonionic surfactant is an alkyl and/or alkenyl oligoglycoside.

9. The composition of claim 8 wherein the alkyl and/or alkenyl oligoglycoside is present in the composition in an amount of from about 0.01 to 30% by weight, based on the weight of the composition.

10. The composition of claim 7 wherein the auxiliary surfactant is an anionic surfactant and is present in the composition in an amount of from about 0.01 to 20% by weight, based on the weight of the composition.

11. A process for cleaning a hard surface comprising contacting the surface with a composition containing:

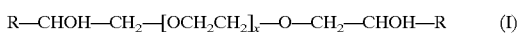
$$R—CHOH—CH_2—[OCH_2CH_2]_x—O—CH_2—CHOH—R \quad (I)$$

wherein R is a linear or branched alkyl and/or alkenyl radical having from about 4 to 22 carbon atoms, and x is a number from about 5 to 90.

12. The process of claim 11 wherein in formula I x is a number from about 10 to 45.

13. The process of claim 11 wherein in formula I x is a number from about 12 to 35.

14. The process of claim 11 wherein in formula I R is a linear alkyl radical having from about 8 to 12 carbon atoms.

15. The process of claim 11 wherein at least about 80% by weight of the gemini surfactant present in the composition have all free hydroxyl groups of polyethylene glycol capped with 1,2-epoxyalkanes.

16. The process of claim 11 wherein the gemini surfactant is present in the composition in an amount of from about 0.01 to 25% by weight, based on the weight of the composition.

17. The process of claim 11 wherein the composition further comprises an auxiliary surfactant selected from the group consisting of a nonionic surfactant, an anionic surfactant, and mixtures thereof.

18. The process of claim 17 wherein the nonionic surfactant is an alkyl and/or alkenyl oligoglycoside.

19. The process of claim 18 wherein the alkyl and/or alkenyl oligoglycoside is present in the composition in an amount of from about 0.01 to 30% by weight, based on the weight of the composition.

20. The process of claim 17 wherein the auxiliary surfactant is an anionic surfactant and is present in the composition in an amount of from about 0.01 to 20% by weight, based on the weight of the composition.

* * * * *